C. F. SMITH.
BUTTER CUTTER.
APPLICATION FILED JULY 22, 1920.
1,426,016. Patented Aug. 15, 1922.
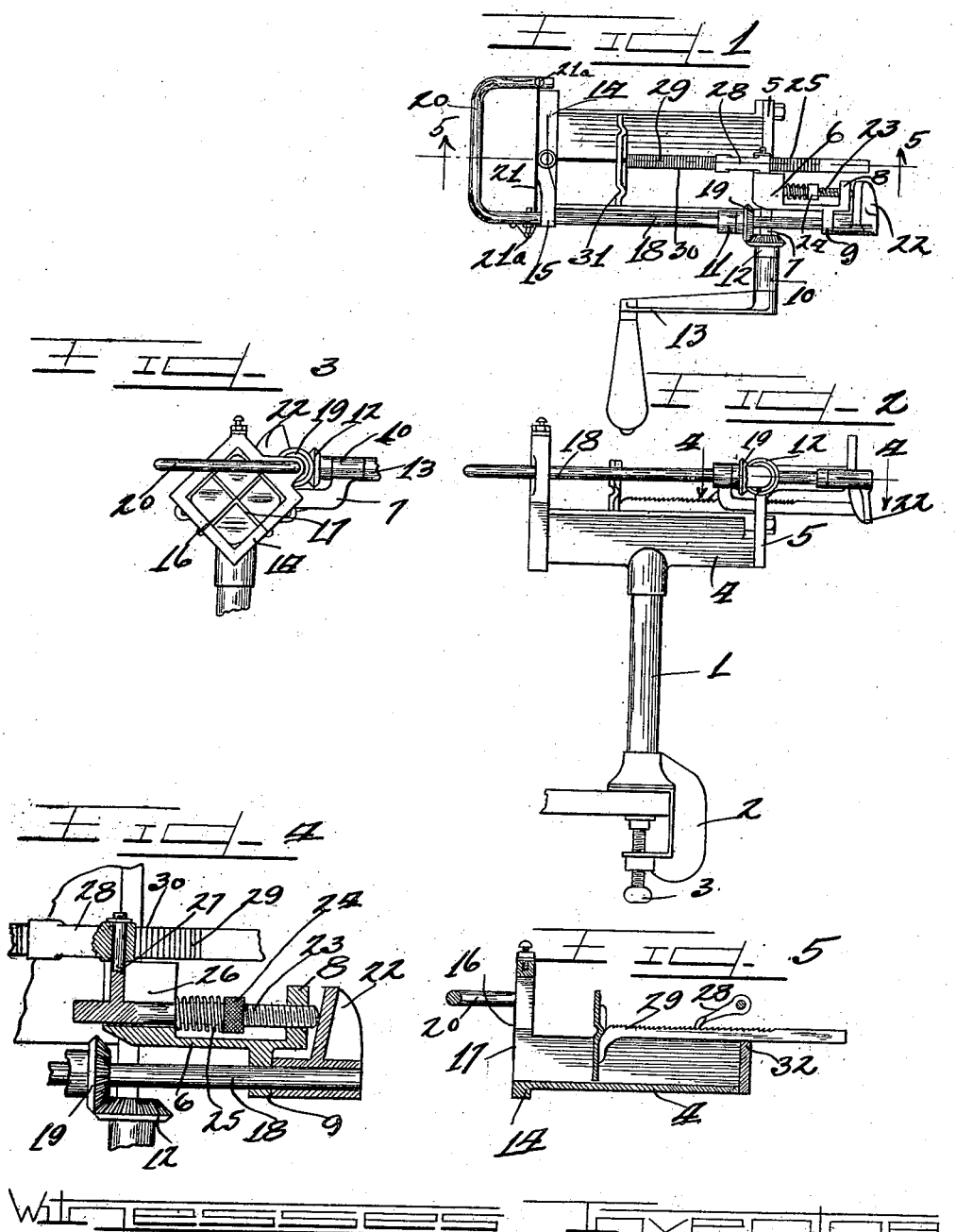

UNITED STATES PATENT OFFICE.

CHARLES F. SMITH, OF CHICAGO, ILLINOIS, ASSIGNOR TO MAXIM MANUFACTURING COMPANY, OF CHICAGO, ILLINOIS, A CORPORATION OF ILLINOIS.

BUTTER CUTTER.

1,426,016.          Specification of Letters Patent.      Patented Aug. 15, 1922.

Application filed July 22, 1920. Serial No. 398,292.

*To all whom it may concern:*

Be it known that I, CHARLES F. SMITH, a citizen of the United States, and a resident of the city of Chicago, in the county of Cook and State of Illinois, have invented certain new and useful Improvements in a Butter Cutter; and I do hereby declare that the following is a full, clear, and exact description of the same, reference being had to the accompanying drawings, and to the numerals of reference marked thereon, which form a part of this specification.

This invention relates to an improved form of butter cutting machine of simple construction and operation.

It is an object of this invention to construct a butter cutter which has an automatic feed, is adjustable for cutting different thicknesses of butter, and that is readily attachable to a support.

It is a further object of this invention to construct the device so that part of the feeding mechanism may be removed so that the butter holding receptacle may be easily cleaned and washed.

It is a still further object to construct the device with as few parts as possible in a compact and novel arrangement as hereinafter more specifically pointed out.

In the drawings:

Figure 1 is a top view of the butter cutting machine.

Figure 2 is a side elevation thereof, with the handle removed.

Figure 3 is an end view showing the cross wires for dividing the butter into four equal parts.

Figure 4 is a section on the line 4—4 of Figure 2, showing the automatic feed, and Figure 5 is a section on the line 5—5 of Figure 1, showing the removable part of the feeding mechanism.

As shown on the drawings:

The reference numeral 1 represents a standard which may be attached to a table or shelf or other support by the familiar clamp 2 and screw 3, as shown in Figure 2. This standard supports the butter receptacle 4, of any form or design, and to one end of which is secured a closing plate 5 by any convenient means such as screws, and having a plurality of brackets 6 and 7; the brackets 6 having a screw supporting lug 8 and a journal supporting lug 9, while the bracket 7 has two journal supporting lugs 10 and 11, the former of which supports the shaft for the bevel gear 12, which is operated by the crank handle 13, which is also attached to said shaft. It is understood that any kind of driving mechanism may be attached to said shaft to operate said bevel gear 12. The other end of the butter receptacle has attached thereto by appropriate means a frame 14, having a journal lug 15. A pair of cross wires 16 and 17 are secured within the frame 14 for a purpose to be later set forth.

Through the journal lugs 9, 11 and 15 above referred to, a driven shaft 18 is journalled. A bevel gear 19 is secured upon said shaft and meshes with the gear 12 to be driven thereby. One end of said shaft is bent into a U-shaped formation denoted as a whole by the numeral 20, and a cutting member in the form of a wire 21 is stretched across the U-shaped member and secured thereto by any desired mechanical expedients such as screws 21$^a$, for example. A cam member 22 of advancing contour is secured on the opposite end of said driven shaft for periodically advancing the resiliently supported and adjustable screw 23, which has a sliding fit in the aforementioned lug 8 at one end, and the other end of which slides freely in the bracket 6. A nut 24 is threaded upon screw 23, and a spring 25 surrounds the screw between the nut and the bracket 6 for urging the screw toward the cam. This nut forms an adjustable stop for the screw 23 as it abuts against the lug 8 when free from the cam member 22 and determines the thickness of the slice of butter to be cut. It will be noted that by turning said nut 24 to the right, the thickness of the piece of cut butter will decrease, while turning screw 24 to the left will increase the thickness thereof.

Referring now to Figure 4, it will be seen that the bracket 6 has a bifurcation 26 ending in its interior point in a groove forming a bearing for the slidable or reciprocating screw element 23. A stud 27 integral with said screw operates in said bifurcation and has attached to its outer end a pawl 28, which is designed to periodically advance a feeding member 29. Said feeding member is in the form of a ratchet bar 30 having a butter engaging abutment 31 at one end. In referring to Figure 5, it will be seen that said abutment slides in the butter receptacle and the ratchet bar rests and slides in a depression 32 in end member 5, forming a guiding means therefor. It will accordingly be noted that as the reciprocating screw element 23 is advanced by the cam 22, the pawl 28 will engage the ratchet bar 30 and advance the butter feeding member a distance equal to the length of movement of the screw element 23 and after the cam 22 has passed by the end of the screw element, the spring 25 acting against the adjustable nut or abutment 24, will return the screw element 23 which with the pawl 28, will now move relatively to the butter feeding member until the nut 24 strikes the bearing lug or abutment 8. This relative movement of screw element 23 is equal to the thickness of the cut butter and this relative movement can be varied by adjusting the nut 24 on the element 23 so that it will project more or less in the path of the cam 22.

It should be particularly noted that the machine is constructed of but few parts; and that the slight thrust of the cam member is absorbed by the intermeshing gears 12 and 19 tending to keep them firmly in mesh and thereby the cutting element in close proximity to the cutting wires, and that the driven shaft and cutter support form a simple integral member and that the butter feeding element is removable.

The operation is as follows:

A suitable piece of butter is placed in the receptacle in advance of the abutment 31, and assuming that the pawl is in engagement with the rack bar and that the screw has been properly adjusted by means of the nut 24 for cutting the desired thickness of butter, the crank 13 is now rotated in a clockwise direction, and through the gears 12 and 19 revolves the driven shaft, which operates the feeding mechanism comprising the screw 23, pawl 28 and the removable butter feeding element 29 by means of the cam member 22 acting on the end of the screw 23. The cam has an advancing contour and advances the feeding mechanism the desired amount at each revolution thereof. The feeding mechanism advances the butter and presses it through the end frame member 14, at which time it is cut longitudinally in a plurality of intersecting planes by the cross wires 16 and 17 before referred to. By this time the cutter 21 will be in position to cut off the butter advanced through the frame in a vertical plane by sweeping across the end thereof.

The operation is repeated at each complete revolution of the driven shaft 18.

While I have described my invention and illustrated one embodiment thereof for carrying it out, it is to be understood that I do not purpose to limit my invention thereto, but contemplate such variation and changes, which do not depart from the principles of this invention, as defined by the scope of the appended claims.

I claim as my invention:

1. In a butter cutting machine, butter feeding mechanism comprising a plurality of relatively movable non-concentric members, having a one-way connection with each other, and an adjustable abutment on one of said members for varying the relative movement of said members.

2. In a butter cutting machine, a butter holding receptacle, a butter feeding member comprising a ratchet bar removably positioned therein, a reciprocating element having a gravity pawl engaging said ratchet bar, means for adjusting the reciprocating movement of said element, and a cutter shaft non-concentric with said reciprocating element and having a cam for operating said element.

3. In a butter cutting machine, a butter holding receptacle, a butter cutter shaft mounted on the side of said receptacle, a butter advancing member comprising a ratchet bar removably mounted in said receptacle, a reciprocating element supported between said shaft and member, said element having a pawl engaging said member, adjustable means on said element for varying the reciprocating movement thereof, and a cam on said shaft for operating said element.

4. In a butter cutting machine, a butter advancing member, a reciprocable element non-concentric therewith and spaced therefrom, a one-way connection between said member and element permitting said member to be readily removed from operative relation with said element, an adjustable stop on said element, adapted for coacting with a stationary abutment upon the inoperative or return movement of said element, and a driving shaft having a cam for actuating said element.

In testimony whereof I have hereunto subscribed my name in the presence of two subscribing witnesses.

CHARLES F. SMITH.

Witness:
CARLTON HILL,
EARL M. HARDINE.